(12) United States Patent
Dirkskötter

(10) Patent No.: US 11,371,727 B2
(45) Date of Patent: Jun. 28, 2022

(54) INSTALLATION MEANS FOR A DEVICE FOR TREATING A NET FLUID WITH A WORKING FLUID

(71) Applicant: Hewitech GmbH & Co. KG, Ochtrup (DE)

(72) Inventor: Frank Dirkskötter, Ochtrup (DE)

(73) Assignee: Hewitech GmbH & Co. KG, Ochtrup (DE)

( * ) Notice: Subject to any disclaimer, the term of this patent is extended or adjusted under 35 U.S.C. 154(b) by 248 days.

(21) Appl. No.: 16/776,598

(22) Filed: Jan. 30, 2020

(65) Prior Publication Data
US 2020/0246748 A1 Aug. 6, 2020

(30) Foreign Application Priority Data

Feb. 4, 2019 (EP) .................................... 19155325

(51) Int. Cl.
*F24F 6/00* (2006.01)
*B01J 19/32* (2006.01)
(Continued)

(52) U.S. Cl.
CPC ................ *F24F 6/00* (2013.01); *B01F 23/00* (2022.01); *B01J 19/32* (2013.01); *F24F 6/04* (2013.01); *B01D 53/18* (2013.01)

(58) Field of Classification Search
CPC ..... B01F 3/04; B01F 23/00; F24F 6/00; F24F 6/04; B01J 19/32
See application file for complete search history.

(56) References Cited

U.S. PATENT DOCUMENTS

| 6,096,407 | A | 8/2000 | Vodicka et al. |
| 9,555,390 | B2 * | 1/2017 | Kreil ........................ B01J 19/32 |
| 2011/0036542 | A1 | 2/2011 | Woike |

FOREIGN PATENT DOCUMENTS

| DE | 6751260 U | 2/1969 |
| DE | 4241859 A1 | 6/1994 |

(Continued)

*Primary Examiner* — Robert A Hopkins
(74) *Attorney, Agent, or Firm* — Christensen Fonder Dardi; Andrew H. Auderieth; Peter S. Dardi

(57) ABSTRACT

The installation means for a device for treating, in particular humidifying and/or cleaning, a net fluid, in particular a gas, by means of a working fluid, in particular a liquid, and particularly for cooling water vapor by means of spray water and/or drip water, is provided with at least one installation package (10) of several square, waved mat elements (12) being arranged in an overlying or adjoining manner Adjacent mat elements (12) are mechanically connected to each other by pin-hole-arrangements in which pins (42) protruding from the one mat element (12) and each comprising a free end are inserted in receiving openings (34) formed in the other mat element (12). The receiving openings (34) each comprise an opening edge (36) from which a flexible clamping tongue (38) protrudes into the receiving opening (34). Each receiving opening (34) comprises an area size limited by the free end of the at least one clamping tongue (38) and the region of the opening edge (36) opposite to said end, or by the free ends of several, in particular two or three clamping tongues (38), wherein the area size (40) being smaller than the cross-section of the pin (42) in the state of the pin (42) in which the pin (42) is received by the receiving opening (34), and in which the at least one clamping tongue (38) is bend with its free end to the free end of the pin and abuts against the pin (42).

9 Claims, 3 Drawing Sheets

Figure 1:
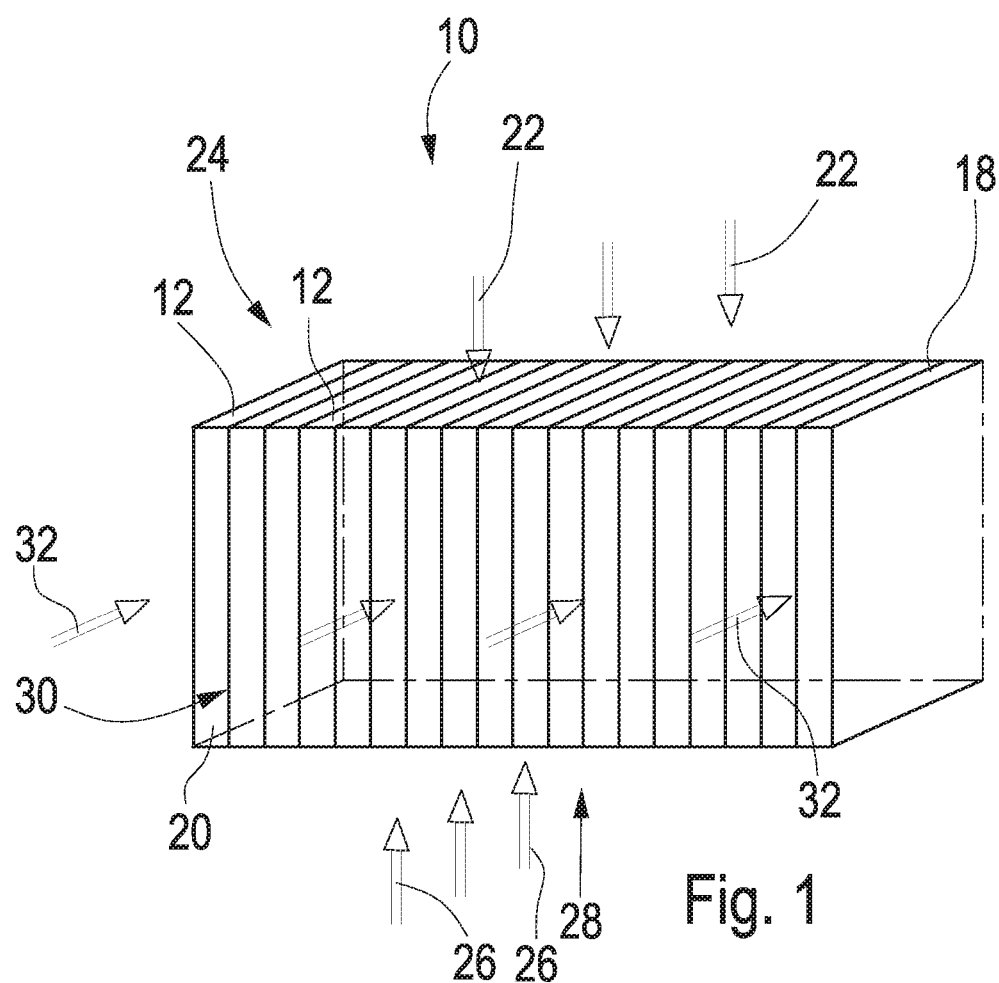

(51) Int. Cl.
 *B01F 23/00* (2022.01)
 *F24F 6/04* (2006.01)
 *B01D 53/18* (2006.01)

(56) References Cited

FOREIGN PATENT DOCUMENTS

| | | |
|---|---|---|
| DE | 19733480 C2 | 2/1999 |
| DE | 19819945 C2 | 11/1999 |
| DE | 10-2006-005113 B4 | 8/2007 |
| DE | 10-2006-025303 B4 | 12/2007 |
| DE | 10-2008-008806 A1 | 8/2009 |
| WO | 2015-044274 A1 | 4/2015 |
| WO | 2018-083329 A1 | 5/2018 |

* cited by examiner

INSTALLATION MEANS FOR A DEVICE FOR TREATING A NET FLUID WITH A WORKING FLUID

This application claims priority to EP application 19 155 325.4 to Dirkskotter, filed on Feb. 4, 2019, which is incorporated herein by reference.

The invention relates to an installation means for a device for treating, in particular humidifying and/or cleaning, a net fluid, in particular a gas, by means of a working fluid, in particular a liquid, and in particular for cooling water vapor by means of spray water and/or drip water.

Devices for treating gases, in particular for humidifying, cleaning and/or cooling gases such as air are generally known. Such devices can serve as evaporation humidifiers or material exchangers, for example, which are used i.a. for air humidification and at the same time for air cooling in residential or office buildings, warehouses, stables, greenhouses and other rooms, for example, or also in technical facilities for cleaning and particularly dedusting supply air or exhaust air for reactive gas or air purifications (in particular for removing odorous substances such as ammonia from the stable exhaust air), for example. Cooling a gas by means of such devices is based on the principle of adiabatic cooling (evaporative cooling). However, treatment devices particularly also serve as heat exchangers being installed in or at cooling towers, for example, and are generally known as being designed as shower coolers.

The known treatment devices of the aforementioned types comprise installation means in the form of installation packages each comprising a plurality of mat elements which are mostly waved, such that, when adjacent mat elements are lying close to each other, channels are formed, which cross each other or are laterally offset, through which the gas flows in via an inlet side of the device, flows through the device and flows out at an opposite outlet side. Examples for such mat elements and for installation packages formed thereof are described in WO-A-2015/044274 and DE-U-67 51 260.

The inlet and outlet sides of the device or the installation packages, respectively, are formed by opposite edges of individual adjoining mat elements of the installation packages arranged at the inlet or outlet side of the device. Thus, the fluid to be treated flows through parallel to the extension of the mat elements between their corresponding edges and between the mat elements. In general, it also possible that the fluid to be treated flows transversely to the extension of the mat element.

The installation packages of the aforementioned types of net fluid treatment devices are wetted with liquid, the so-called working fluid, which is in particular water, such that the net fluid to be treated flows along wetted areas of the mat elements. In this regard, it is desirable that the wetting liquid forms a surface being as large as possible and is kept in the device or the installation packages over a longer period of time.

The mat elements usually have a rectangular shape, wherein several adjacent mat elements form a block-shaped (cuboid) installation package. However, it is also possible that the installation packages comprise other geometric forms. By using rectangular mat elements of different sizes, for example, it would be possible to obtain a cylindric installation package. The widest mat elements are then arranged lengthwise a diameter of the cross-section of the cylinder, wherein the respective adjacent mat elements have a reduced width.

The known net fluid treatment devices can operate according to the counter-flow principle or the cross-flow principle. According to the counter-flow principle, the fluid to be treated and the working fluid (e.g. cooling medium) used for treating said fluid flow opposite to each other. In treatment devices operating according to the cross-flow principle, the flow directions of the fluid to be treated and the working fluid cross each other, usually at a substantially right angle.

The individual mat elements of installation means of the aforementioned type are usually interconnected by pin-hole constructions. Examples for such connection techniques are described in DE 42 41 859 A1, DE 197 33 480 C2, DE 198 19 945 C2, DE 10 2006 005 113 B4, DE 10 2006 025 303 B4 and DE 10 2008 008 806 A1.

An object of the invention is to provide an installation means for a device for treating a net fluid with a working fluid in which establishing the connection of the individual adjoining mat elements of the installation means is simplified.

This object of the invention is achieved by providing an installation means for a device for treating, in particular humidifying and/or cleaning, a net fluid, in particular a gas, by means of a working fluid, in particular a liquid, and particularly for cooling water vapor by means of spray water and/or drip water, comprising

- at least one installation package of several square, waved mat elements being arranged in an overlying or adjoining manner,
- wherein adjacent mat elements are mechanically connected to each other by pin-hole-arrangements in which pins protruding from the one mat element and each comprising a free end are inserted in receiving openings formed in the other mat element,
- wherein the receiving openings each comprise an opening edge from which a flexible clamping tongue protrudes into the receiving opening, and
- wherein each receiving opening comprises an area size limited by the free end of the at least one clamping tongue and the region of the opening edge opposite to said end, or by the free ends of several, in particular two or three clamping tongues, wherein the area size being smaller then the cross-section of the pin in the state of the pin in which the pin is received by the receiving opening, and in which the at least one clamping tongue is bend with its free end to the free end of the pin and abuts against the pin.

According to the invention, the installation means comprises at least one installation body having at least one mat element which, when viewed from the side, i.e. when viewing the edge of the mat element, comprises a thickness gradient. In the installed state, the installation body is arranged such that the individual mat elements are positioned upright, i.e. are vertically aligned. The working fluid is applied from above to the installation body. Said working fluid can be spray water and/or drip water. Said working fluid now flows vertically through the installation body, wherein the working fluid flows lengthwise the mat elements over the surface of the mat elements or drips off the surface, respectively. Optionally, at least one mat element comprises a thickness gradient such that said mat element is not only arranged vertically but also oblique to the vertical or comprises several oblique sections, respectively. The water flowing along the section oblique to the vertical drops off the mat element and thus forms an enlarged area being exposed to the net fluid pervading the installation body in a counter-flow or a cross-flow.

The mat elements are usually waved and particularly comprise a grid structure although sometimes waved foil mat elements are also used. The height of the waves varies according to the fulfillment of at least one of the mat elements. The highest points or lines of the elevations of the waves and the lowest points or lines of the depressions of the waves are each in common planes. The upper plane of the highest points or lines is usually aligned in parallel (but can optionally not be aligned in parallel) toward the lower plane defined by the lowest points or lines. If the upper and lower plane are not parallel, both planes are tilted against each other one-dimensionally or two-dimensionally, thereby forming the above-described thickness gradient along one or both area dimensions (length and/or width of the mat element).

As a thickness extension of a mat element, the distance between the highest elevation on the upper side of the mat element and the highest elevation on the lower side of the mat element can be taken. In case of a waved mat element, the thickness extension is thus the height distance between the elevations and the depressions (valleys and hills) plus the material thickness.

The connection technique used according to the invention comprises pin-hole arrangements acting in a self-locking manner. For this purpose, the hole arrangement comprises a receiving opening with an opening edge from which a flexible clamping tongue, preferably several flexible clamping tongues, protrude/s into the receiving opening. The receiving opening comprises an area size limited by the free end of the at least one clamping tongue and the region of the opening edge opposite to said end, or by the free ends of several, in particular two or three clamping tongues, wherein the area size being smaller than the cross-section of the pin in the state of the pin in which the pin is received by the receiving opening, and in which the at least one clamping tongue or the several clamping tongues is/are bend with its/their free ends to the free end of the pin and abut/s against the pin. A pin bending the clamping tongue/s in such a way when being inserted into the receiving opening, wedges with the clamping tongues all the more, the more traction forces are acting on the pin. This self-locking connection mechanism guarantees that adjoining mat elements that have been connected to each other once can hardly and in the ideal case cannot at all automatically separate from each other unintentionally.

In an expedient embodiment of the invention it may be provided that the pin-hole arrangement of two mat elements connected to each other is configured to be pairwise complementary.

In a further advantageous embodiment of the invention it may be provided that three clamping tongues, each arranged offset by 120°, protrude from the opening edge of a receiving opening, and/or that the pins have a round, in particular circular or polygonal cross-section.

Figure 2:
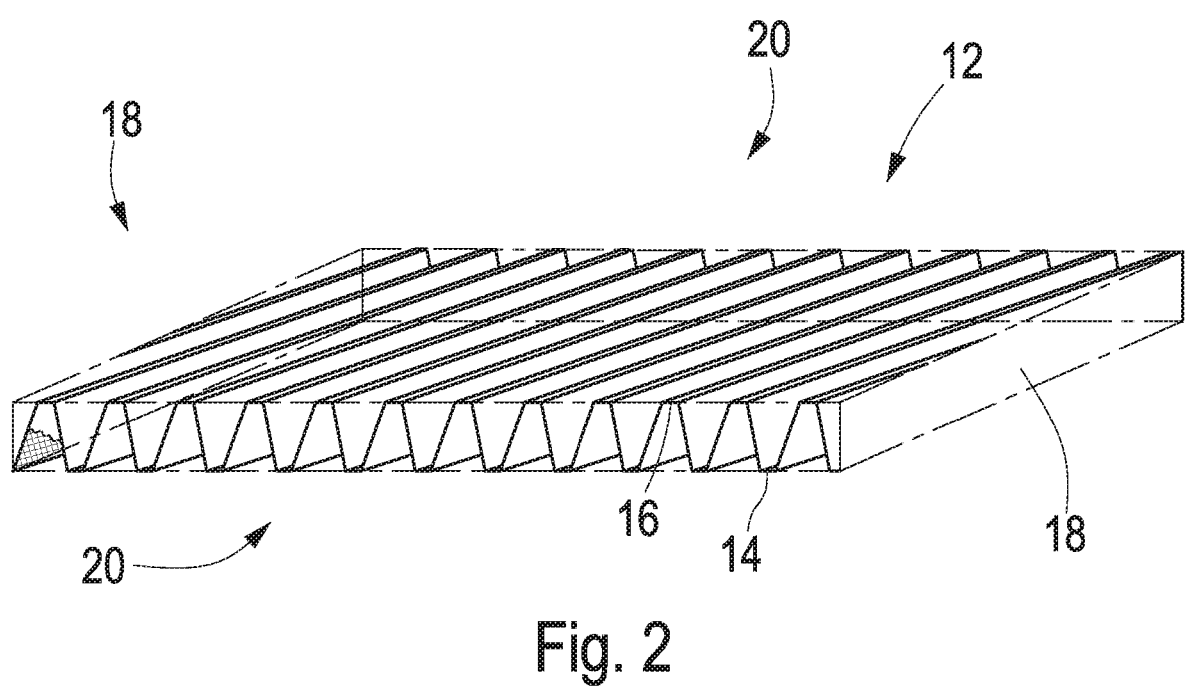
Figure 3:
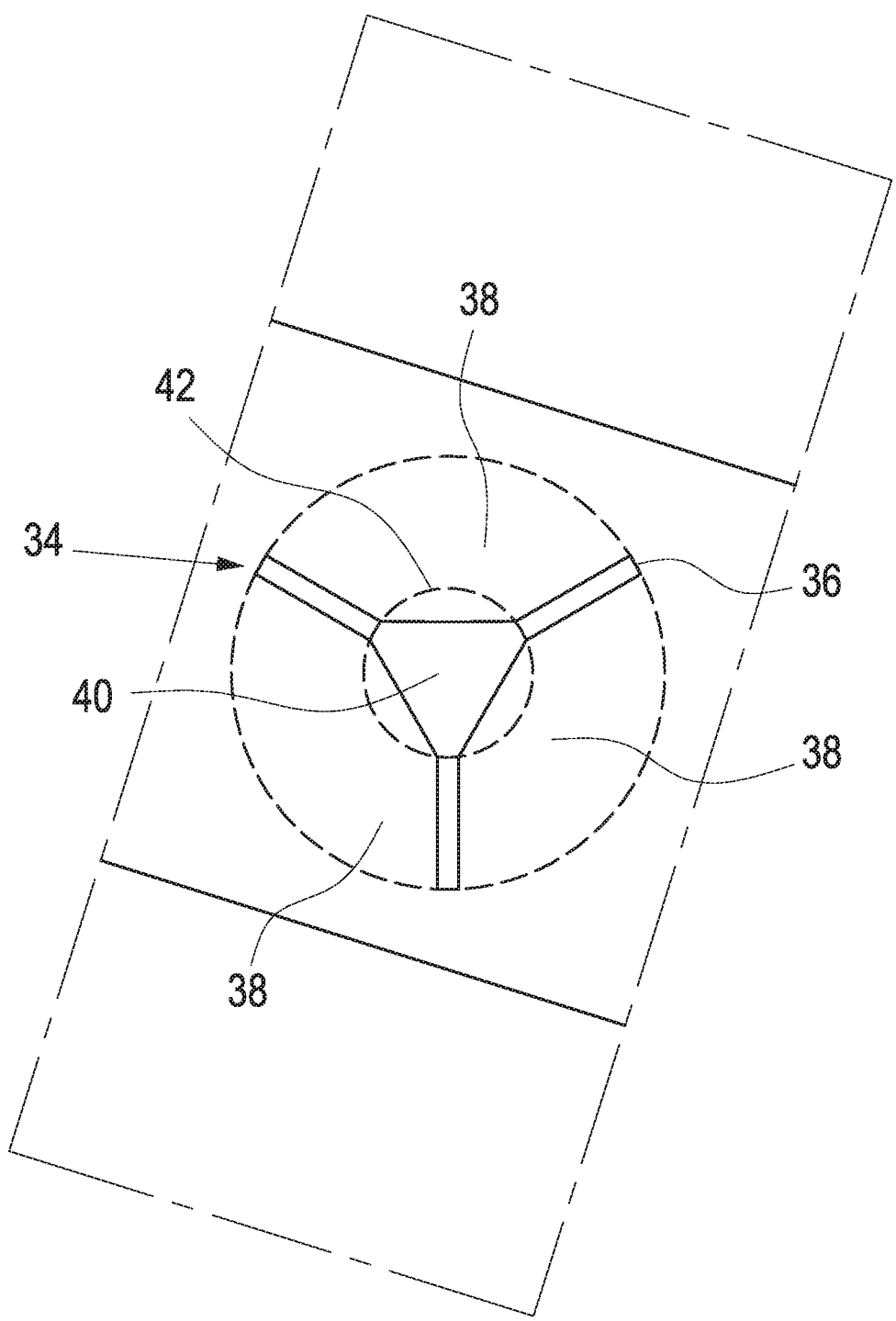
Figure 4:
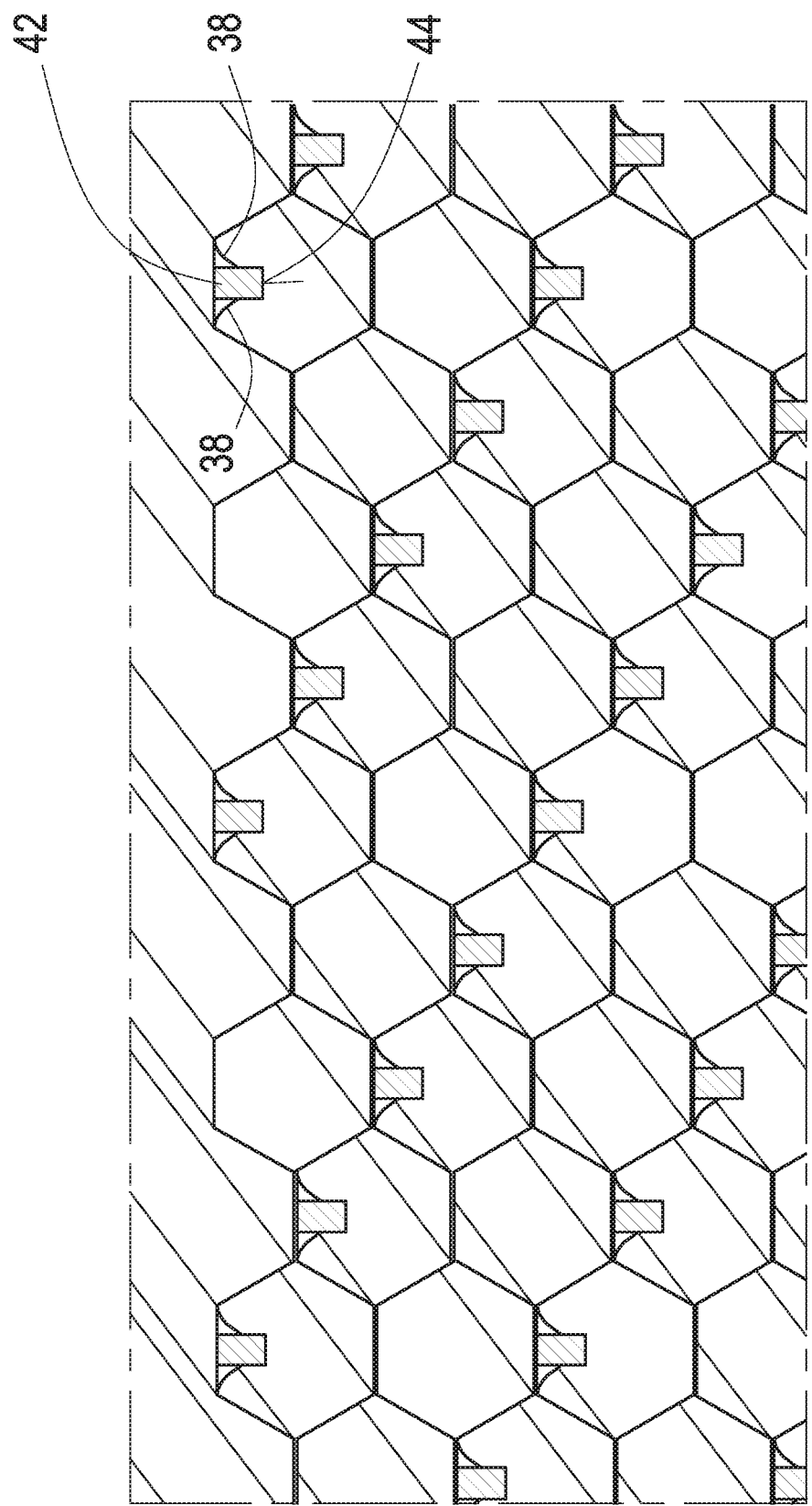

In the following, an exemplary embodiment of the invention is described in detail by reference to the drawing in which:

FIG. 1 shows a highly schematic perspective view of an installation body with mat elements connected to each other according to the invention, FIG. 2 shows a perspective view of a mat element several of which are used in the installation body of FIG. 1, FIG. 3 shows a plan view of the mat element of FIG. 2 for illustrating the pin-hole arrangement for connecting adjacent, overlying mat elements, and FIG. 4 shows a schematic side view of several adjacently arranged mat elements illustrating the pin-hole connection.

FIG. 1 shows a highly schematic view of an installation package 10 of mat elements 12 being alternately arranged to be twisted against each other by 180° and having the same structure. The mat elements 12 are waved and alternately comprise successive depressions 14 and elevations 16 as indicated in FIG. 2. Each mat element 12 comprises two opposite transverse edges 18 and two opposite longitudinal edges at a right to the transverse edges 18. The waves, i.e. the "hills" (elevations 16) and "valleys" (depressions 14), are at an acute angle both to the transverse edges 18 and to the longitudinal edges. It can be recognized that the lowest points of the depressions 14 or the bottoms formed by said lowest points are in a common lower plane 17 or span said plane 17, while the highest points or plateaus of the elevations 16 are in a common upper plane 19. Both planes 17, 19 are parallel to each other but could also be tilted one-dimensionally or two-dimensionally, such as described in WO 2018/083329 A1. Spray water or drip water which is applied as working fluid 22 to the upper side 24 of the installation package 10 drops off inside the installation package 10 and gets entangled at the mat elements 12 or the grid structure and thus forms an enlarged surface such that it provides the net fluid flowing in the counter-flow (see flow arrows 26) into the lower side 28 or flowing from the lateral side 30 with a larger surface. This leads to an increased exchange or interaction of net fluid and working fluid.

With reference to FIGS. 3 and 4, the pin-hole connection construction, according to the invention, of adjacent mat elements 12 is described in the following. In this context it should be noted that for reasons of clarity the pin-hole connection construction is not illustrated in FIG. 2.

As can be seen in FIG. 3, the pin-hole connection construction comprises receiving openings 34 each of which comprise an opening edge 36 from which the clamping tongues 38 (in the exemplary embodiment three clamping tongues per receiving opening 34) extend into the receiving opening 34. In the center of each receiving opening 34, an opening region with an area size 40 in formed whose limitation defines a region being smaller than the cross-section of a pin 42 which is inserted into the receiving opening 34 or into the region of the area size 40 remaining free, when two mat elements 12 are connected to each other in an overlying manner. Thus, the clamping tongues 38 bend towards the free end 44 of the pin 42, are positioned to this extent and form a resistance against a detachment of both mat elements 12, thus leading to a self-clamping effect.

LIST OF REFERENCE NUMERALS 10 installation package
12 mat element of installation package
14 depressions of mat element
16 elevations of mat element
17 lower plane of mat element
18 transverse edges of mat element
19 upper plane of mat element
20 longitudinal edges of mat element
22 working fluid
24 upper side of installation package
28 lower side of installation package
30 lateral sides of installation package
32 net fluid
34 receiving opening
36 opening edge
38 clamping tongues
40 area size
42 pin
44 end of pin.

The invention claimed is:

1. An installation means for a device for treating a net fluid by means of a working fluid for cooling water vapor by means of spray water and/or drip water comprising
    at least one installation package of several square, waved mat elements being arranged in an overlying or adjoining manner,
    wherein adjacent mat elements are mechanically connected to each other by pin-hole-arrangements in which a plurality of pins protruding from a first mat element, each of the plurality of pins comprising a free end, are inserted in receiving openings formed in a second mat element,
    wherein the receiving openings each comprise an opening edge from which at least one flexible clamping tongue protrudes into the receiving opening, and
    wherein each receiving opening comprises an area size limited by the free end of the at least one clamping tongue and the region of the opening edge opposite to said end, or by the free ends of a plurality of clamping tongues, wherein the area size being smaller than the cross-section of the pin in the state of the pin in which the pin is received by the receiving opening, and in which the at least one clamping tongue or the plurality of clamping tongues is bent with its free end towards the free end of the pin and abuts against a side wall of the pin, thereby securing the first and second mat elements to one another through continued application of a resistive force against the pin.

2. The installation means according to claim 1, characterized in that the pin-hole arrangement of two mat elements connected to each other is configured to be pairwise complementary.

3. The installation means according to claim 1, characterized in that three clamping tongues, each being arranged to be offset by 120°, protrude from the opening edge into a receiving opening, and/or that the pins have a round cross-section.

4. The installation means according to claim 2, characterized in that three clamping tongues, each being arranged to be offset by 120°, protrude from the opening edge into a receiving opening, and/or that the pins have a round cross-section.

5. The installation means according to claim 1 wherein the treatment is for humidifying and/or cleaning the net fluid.

6. The installation means according to claim 1 wherein the net fluid is water vapor and the working fluid is spray water and/or drip water and wherein the treatment is for cooling the water vapor by means of the spray water and/or drip water.

7. The installation means according to claim 1, wherein the net fluid is a gas and/or the working fluid is a liquid.

8. The installation means according to claim 3, wherein the round cross-section is circular or polygonal.

9. The installation means according to claim 4, wherein the round cross-section is circular or polygonal.

* * * * *